UNITED STATES PATENT OFFICE.

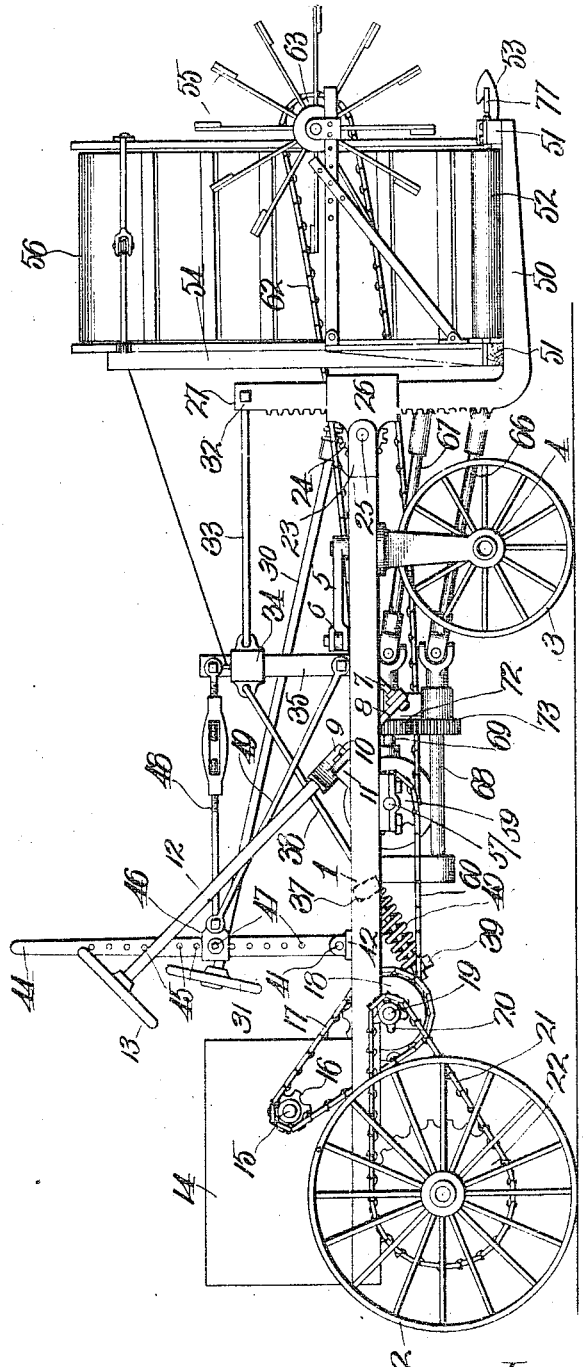

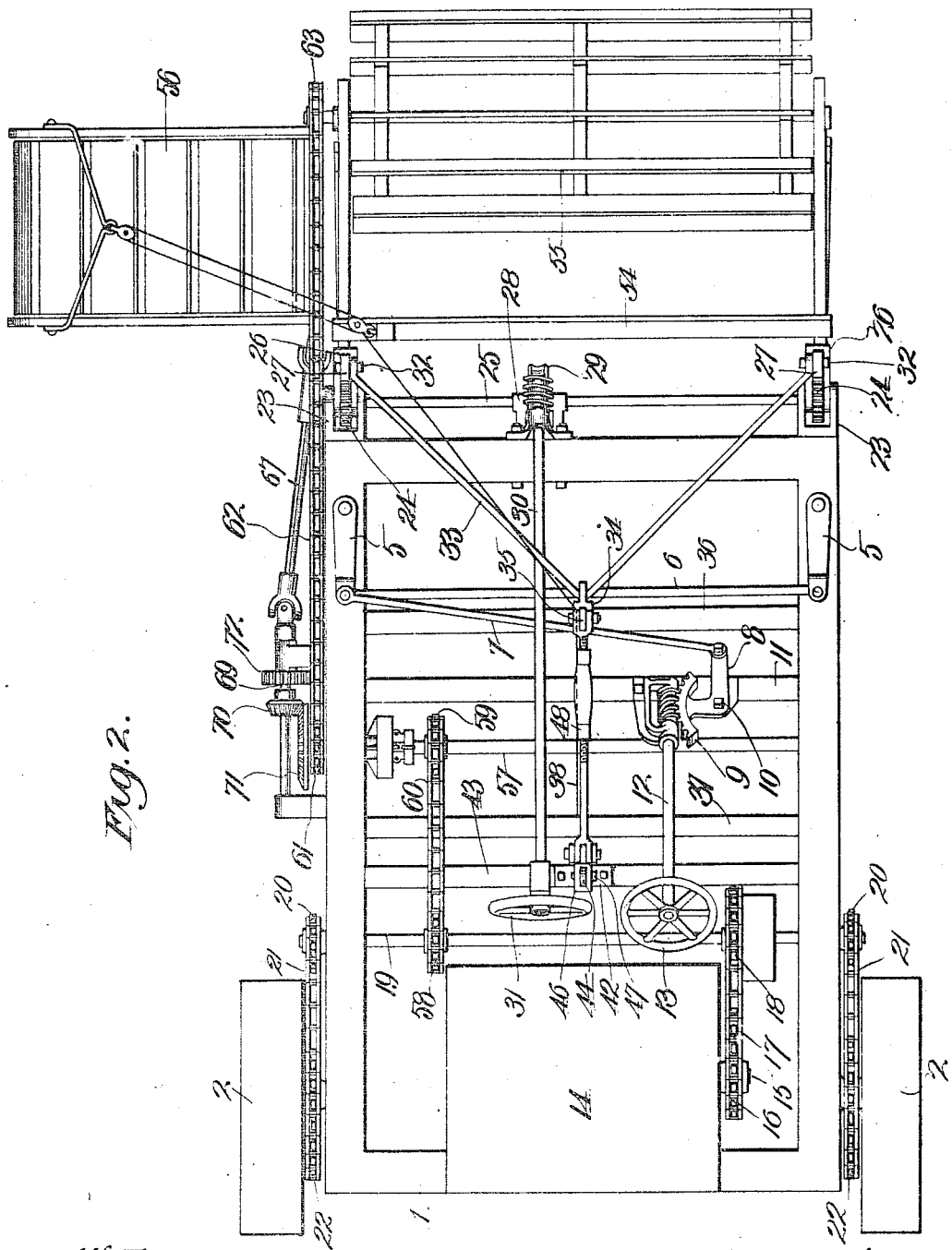

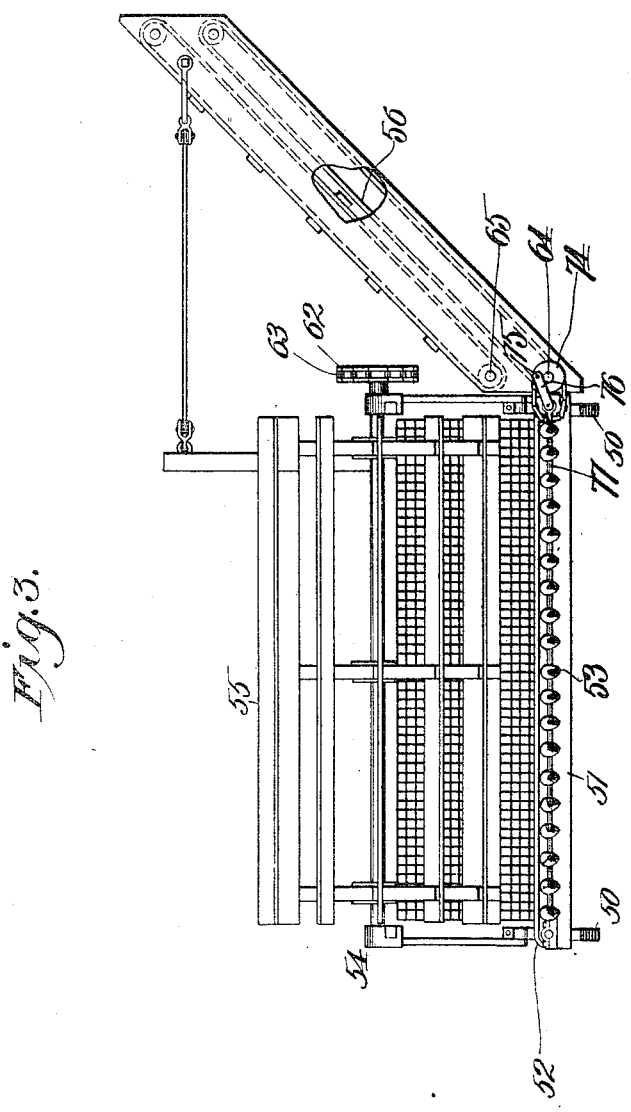

REED C. TOWNER, OF FAIRPORT, KANSAS.

GRAIN-HEADER.

959,819.  Specification of Letters Patent.  Patented May 31, 1910.

Application filed October 7, 1909. Serial No. 521,611.

*To all whom it may concern:*

Be it known that I, REED C. TOWNER, a citizen of the United States, residing at Fairport, in the county of Russell and State of Kansas, have invented certain new and useful Improvements in Grain-Headers, of which the following is a specification.

This invention relates to grain headers and more especially to machines of the character mentioned driven by an engine or other motor mounted upon the machine, and my object is to produce an efficient and reliable machine in which the cutting mechanism may be adjusted vertically or pivotally toward and from the ground.

A further object is to produce a machine of this character of simple, strong, durable and comparatively inexpensive construction.

With these objects in view and others as hereinafter appear, the invention consists in certain novel and peculiar features of construction and organization as hereinafter described and claimed; and in order that it may be fully understood reference is to be had to the accompanying drawings, in which:

Figure 1, is a side elevation of a machine embodying my invention. Fig. 2, is a top plan view of the same. Fig. 3, is a front view of the same.

In the said drawings, 1 indicates a frame preferably rectangular as shown mounted upon a pair of rear carrying wheels 2, and a pair of front carrying-wheels 3, the latter being journaled in yokes 4 swiveled in the side bars of the frame and provided at the upper sides of the latter with rigid rearwardly-projecting crank arms 5 pivotally connected by a cross bar 6.

7 is a link pivotally connecting one end of cross bar 6 with the crank arm 8 of a worm segment 9 pivoted at 10 on a cross bar 11 and engaged by a worm shaft 12 journaled in any suitable manner not shown, and disposed at an angle of substantially forty-five degrees and provided at its upper or rear end with a hand-wheel or steering-wheel 13.

14 is a casing containing an engine not shown mounted on the rear end of the machine, and mounted on the drive shaft 15 of the engine is a sprocket wheel 16 connected by a chain 17 to a sprocket wheel 18 secured on a suitably journaled transverse shaft 19 equipped at each end with a small sprocket wheel 20 connected by a chain 21 to a large sprocket wheel 22 bearing a rigid relation to the rear wheels 2, so that in the operation of the engine in one direction or the other, the wheels 2 shall be driven forwardly or rearwardly and propel the machine accordingly. Secured to the front corners of the frame are bifurcated or forked brackets 23 and journaled therein are cog wheels 24, and pivoted on the shaft 25 of the cog wheels are sleeves 26 in which fit slidingly rack bars 27 meshing with said cog wheels. Secured to and midway the length of the front end-bar of frame 1 is a forked bearing bracket 28 and arranged within said bracket and secured upon shaft 25 is a worm wheel 29, engaged by a suitably journaled worm shaft 30 provided with a hand-wheel 31, so that through said hand-wheel vertical movement, upward or downward, may be transmitted to the rack bars 27. Pivotally connected to the upper ends of the rack bars at 32 is a V-shaped link 33, the rear end of the same being pivoted to a sleeve 34 fitting on an upright 35 pivotally mounted on a cross bar 36, and pivoted to said sleeve and extending downward and rearward therefrom through a suitable guide or cross bar 37 is a rod 38 provided at its rear end with a nut 39, a spring 40 being interposed between the nut and rod and tending to swing upright 35 rearward. Pivoted at 41 to a bracket 42 carried by a cross bar 43 of the frame is a swing bar 44 provided with a longitudinal series of holes 45 and fitting adjustably on said swing bar is a sleeve 46 secured at the desired point of adjustment on the bar 44 by a removable pin 47 extending through the sleeve 46 and one of the series of perforations of bar 44.

48 is an extensible and contractible rod and pivotally connected at its rear end to sleeve 46 and at its front end to the upper end of the upright 35, this rod being adapted to sustain tensile strain, and pivotally connected to said sleeve 46 and to upright 35 coincidentally with the pivotal point of the latter is a brace 49, said brace and rod 48 bearing a rearward converging relation.

When it is desired to tilt the rack bars in one direction or the other the person in control of the machine withdraws pin 47 and slides sleeve 46 upward or downward upon swing bar 44. When the sleeve 46 is slid upward the rack bars through the weight of the parts carried thereby, swing around shaft 25 as the pivot. As this action occurs the pivoted upright is swung forward by the V-shaped link 33, and the sleeve-carrying bar 44 is swung in the same direction through its connection with upright 35 by means of rod 48, it being noted in this connection that the movements described of the rack bar, upright 35 and swing bar 48 are cushioned by spring 40, downward movement of said sleeve reversing the adjustment of the parts referred to, the spring 40 coöperating in such reverse adjustment of said parts.

The rack bars are provided at their lower ends with forwardly-projecting arms 50 connected by parallel transverse bars 51 and constituting a frame in conjunction therewith, for the support of the customary traveling conveyer 52 adapted to receive the heads of the grain severed by the usual cutting mechanism 53. Erected upon the last-named frame is a framework 54 of any suitable or preferred type and journaled in said framework above the cutting mechanism is a reel 55 adapted to knock the grain as it is severed by the cutting mechanism, upon the conveyer. The grain, as customary, is transferred by the traveling conveyer to the elevator conveyer 56 suitably supported in the usual relation to the frame of the traveling conveyer to deposit the grain in a wagon moving along by the side of the machine.

57 is a shaft journaled in frame 1 and connected to shaft 19 through the medium of a sprocket wheel 58 upon the last-named shaft, sprocket-wheel 59 on shaft 57 and a chain 60 connecting said shafts. At one end shaft 57 is equipped with a sprocket wheel 61 connected by a chain 62 to a sprocket wheel 63 rotatable with the reel. The drive shafts 64 and 65 of the elevator conveyer are driven by tumbling shafts 66 and 67 universally coupled to longitudinal shafts 68 and 69 respectively, shaft 69 being connected by a bevel gear 70 with a bevel gear 71 on shaft 57. Said shaft is provided with a gear wheel 72 meshing with a gear wheel 73 on shaft 68 to drive the latter. The shaft 64 is equipped at its front end with a wheel 74 provided with a wrist pin 75 connected by a link 76 with the reciprocatory cutter bar 77 of the cutting mechanism.

From the above it will be seen that the engine is utilized to not only propel the machine in the desired direction but also to drive the operative parts of the machine and that the adjustment of the sleeve 46 is for the purpose of adjusting the cutting mechanism to operate at different distances from the ground, the tilting of the rack bars disposing the cutting mechanism for most effective operation upon inclined or rolling ground. For instance when the machine passes over the crest of a hill and starts down an incline it is necessary to tilt the conveyer-belt-carrying frame downward so that the cutting mechanism shall be disposed at about the same distance from the ground that it was when traveling over level ground. In traveling up a hill the tilting adjustment of said frame must be reversed so as to raise the cutting mechanism for the same reason, it being understood of course that the reel and other parts movable with the last-named frame will move with and in the same direction as the cutting mechanism. The spring 40 is mainly for the purpose of absorbing the shocks or jars incident to the adjustment of the rack-bar-carrying frame.

From the above description it will be apparent that I have produced a grain header embodying the features of advantage enumerated in the statement of the object of the invention and while I have illustrated and described the preferred embodiment of the same it will be apparent that it is susceptible of modification in various particulars without departing from the spirit and scope of the appended claims.

Having thus described the invention what I claim as new and desire to secure by Letters Patent, is:

1. A grain header, comprising a wheeled frame, sleeves pivoted to said frame for movement in a vertical plane, rack bars slidingly mounted in the sleeves, a frame carried by and forward of the rack bars and equipped with a traveling conveyer and a cutting mechanism, a reel overlying the cutting mechanism, an elevator conveyer to receive the grain from the traveling conveyer, means for operating the cutting mechanism, the reel and said conveyers, cog-wheels engaging said rack bars, and means for turning said cog-wheels to impart upward or downward movement to the rack bars.

2. A grain header, comprising a wheeled frame, sleeves pivoted to said frame for movement in a vertical plane, rack bars slidingly mounted in the sleeves, a frame carried by and forward of the rack bars and equipped with a traveling conveyer and a cutting mechanism, a reel overlying the cutting mechanism, an elevator conveyer to receive the grain from the traveling conveyer, means for operating the cutting mechanism, the reel and said conveyers, cog-wheels engaging said rack bars, means for turning said cog-wheels to impart upward or downward movement to the rack bars, and means for simultaneously tilting said sleeves in one direction or the other and thereby imparting like movement to the rack bars and the parts carried thereby.

3. A grain header, comprising a wheeled frame, sleeves pivoted to said frame for movement in a vertical plane, bars slidingly mounted in the sleeves, a frame carried by and forward of said bars, a traveling conveyer, a cutting mechanism, a reel and an elevator conveyer carried by said frame and movable with said frame, means for vertically-adjusting said bars in said sleeves, and means for pivotally adjusting the sleeves and the parts carried thereby.

4. A grain header, comprising a suitable frame, a pair of rear wheels therefor, a pair of front swiveled wheels therefor, means to simultaneously turn said swiveled wheels to guide the machine in the desired direction, a pivoted upright, a perforated bar pivoted to the frame, a sleeve slidingly mounted on said bar, a removable pin engaging the sleeve and one of the perforations of the arm, a tension rod pivotally connecting the sleeve and the upper end of said upright, a brace bar pivotally connected to the said sleeve and to the lower part of said upright, a sleeve upon the upright, means connected to said sleeve tending to swing the same rearwardly, a pair of sleeves pivoted to the front end of the frame, bars extending slidingly through said sleeves, and a traveling conveyer, cutting mechanism and a reel carried by the last-named frame.

5. A grain header, comprising a suitable frame, a pair of rear wheels therefor, a pair of front swiveled wheels therefor, means to simultaneously turn said swiveled wheels to guide the machine in the desired direction, a pivoted upright, a perforated bar pivoted to the frame, a sleeve slidingly mounted on said bar, a removable pin engaging the sleeve and one of the perforations of the arm, a tension rod pivotally connecting the sleeve and the upper end of said upright, a brace bar pivotally connected to the said sleeve, and to the lower part of said upright, a sleeve upon the upright, means connected to said sleeve tending to swing the same rearwardly, a pair of sleeves pivoted to the front end of the frame, bars extending slidingly through said sleeves, a traveling conveyer, cutting mechanism and a reel carried by the last-named frame, a transverse shaft journaled in the first-named frame and forming the pivotal support of the sleeves at the front end of said frame, wheels rotatable with said shaft and engaging the bars extending slidingly through the said sleeves, and means for turning said shaft for the purpose of imparting upward or downward movement to the said bars extending through the pivoted sleeves.

In testimony whereof I affix my signature, in the presence of two witnesses.

REED C. TOWNER.

Witnesses:
H. E. BAXTER,
JOHN MCKINLEY.